July 30, 1935.  W. C. CARD, JR  2,009,575

VALVE DEVICE

Original Filed Feb. 12, 1930

WILLIAM C. CARD JR.
INVENTOR

Watson, Bristol, Johnson & Leavenworth
BY ATTORNEY

Patented July 30, 1935

2,009,575

UNITED STATES PATENT OFFICE 2,009,575

VALVE DEVICE

William Carpenter Card, Jr., Waverly, Mass., assignor to Compo Shoe Machinery Corporation, New York, N. Y., a corporation of Delaware Application February 12, 1930, Serial No. 427,722
Renewed January 3, 1935

8 Claims. (Cl. 251—137)

This invention relates to presses for use in the manufacture of shoes and more particularly to that type of shoe press which is adapted for use in those presses wherein the outer sole is affixed to the lasted upper by means of an adhesive cement.

It is an object of this invention to provide a new and improved valve mechanism particularly designed for use in a shoe press in accordance with which the usual inflatable pad of such a press may be inflated or deflated easily and, when desired, automatically, without danger of leaks within the valve itself.

It is a further object to provide a new and improved valve which will be simple in operation and inexpensive and reliable in construction.

Other objects will in part be obvious and will in part appear hereinafter.

The invention accordingly comprises the features of construction, combination of elements and arrangement of parts, which will be exemplified in the construction hereinafter set forth, and the scope of the application of which will be indicated in the claims.

For a fuller understanding of the nature and objects of the invention, reference should be had to the following detailed description taken in connection with the accompanying drawing, in which:—

This invention is particularly adapted for use in the construction of shoe presses for the manufacture of shoes by the cementing process. In the manufacture of such shoes, the sole is affixed to the upper by the means of an adhesive cement and held firmly in place against the lasted upper by an inflated pad. In affixing soles to shoes by this method, it is necessary for the sole to be held under pressure until the cement has set, and in commercial operation a chief difficulty in using inflatable pads is due to the occurrence of leaks around the connection between the bladder and the body of the valve or within the valve itself. For this reason, in accordance with the principles of the present invention, there is provided a single valve for accomplishing both inflation and deflation of the pad, and having novel means for insuring a prevention of leakage of air through the valve.

Figure 1:
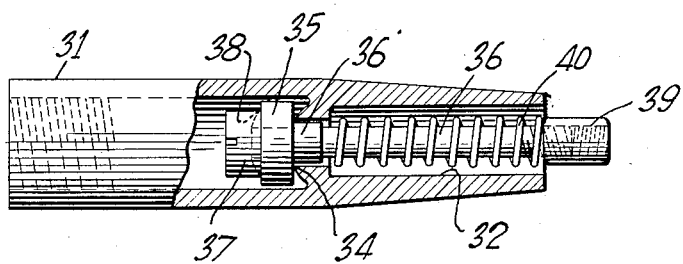
Figure 1 is a composite view of one form of valve embodying this invention, the mechanism being partly broken away to disclose the interior construction.

More particularly, the valve, as shown in Fig. 1, comprises a tubular member 31 having a small diameter bore 32 at its front end and a bore 33 of larger diameter at its rear end, said bores meeting within the member 31 at a point substantially equi-distant from either end. At the point of juncture, the member 31 is provided with an annular rearwardly projecting seat 34 against which rests a washer 35 of rubber or other suitable material, and through this washer extends a stem 36 having an enlargement 36' and carrying a mating valve member 37 which latter is similarly provided with a forwardly projecting annular seat 38. The stem 36 has an enlargement 36' which holds the washer 35 in position against the seat 38, and said stem projects through the bore 32, and is preferably threaded at its end to receive a head member or nut 39 between which and the outer side of the valve seat 34 is disposed a coil spring 40 surrounding the stem 36 and normally urging the valve to closed position. It will be seen that the seat 34 is located on the rear face of an internal flange within the valve tube 31, and that the forward or opposite face of this flange affords a seat for spring 40. As shown in Fig. 1, the annular valve seat 34 is of convex form and terminates rearwardly in a feather edge, while the mating valve member 37 has a concave forward face (indicated in dotted line) which similarly terminates in a forwardly projecting feather edge. Preferably these feather edges, while concentric with the central stem 36, are located in non-registry on opposite sides of washer 35 whereby they are adapted to bear in line contact against the latter to compress or flex it. Such an arrangement assures an air tight conduit.

Figure 2:
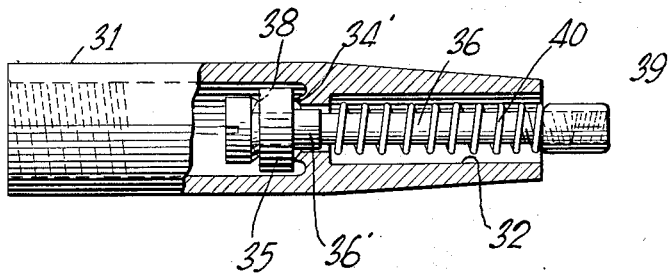
Figure 2 is a similar view showing a modification.

In the form shown in Fig. 2, annular seats 34 and 38 are offset somewhat with respect to the peripheries of the members on which they are situate, as indicated at 34' and 38'. Here, the rearwardly facing valve seat 34' is bevelled so as to terminate in a rearwardly facing feather edge which, if desired, may be located in non-registry with the opposed annular feather edge at 38', in accordance with the teaching in the first described form. The beveling adjacent seat 34 provides a concavity in the rearwardly facing portion of the annular flange which is so contoured as to facilitate re-entry of enlargement 36' within the internal flange, if it should be displaced from such flange by inward movement of stem 36.

From the above description it will be clear that the valve may be opened for the admission or release of air by the depression of the head member 39 and this may be accomplished in any convenient manner.

It is intended that the presses with which this valve is utilized may be carried successively by a conveyor from a loading point through a given pathway to consume the time during which the drying operation occurs and back to the loading point again. Prior to reaching the loading point, the head 39 is depressed to deflate the pad and release the completed shoes and free the press for another lasted shoe.

As soon as the new shoe has been inserted, the pad is again inflated through the valve. This form of valve makes it possible to accomplish this result automatically, if desired, or by hand and it may be arranged either that the valve may be depressed to admit air either by the pressure of the incoming air or by the mechanical encounter of the head member 39 with the interior of the air nozzle.

Since certain changes may be made in the above construction, and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. In a device of the class described, a valve comprising a tubular member having an intermediate annular and rearwardly projecting seat, a mating valve member having a forwardly-projecting annular seat, a stem member extending from said last mentioned member and passing through said first mentioned annular seat, a head on said stem member, resilient means between said first mentioned annular seat and said head normally to urge the annular seats toward each other, and a resilient washer member surrounding said stem adjacent said second mentioned annular seat whereby as the two annular seats are forced toward each other, said washer member is compressed therebetween, the projecting portions of said annular seats each being formed to bear in line contact against said washer member.

2. In a device of the class described, a valve comprising a tubular member having an intermediate annular and rearwardly projecting seat, a mating valve member having a forwardly projecting annular seat, a stem member extending from said last mentioned member and passing through said first mentioned annular seat, a head on said stem member, resilient means between said first mentioned annular seat and said head normally to urge the annular seats toward each other, and a resilient washer member surrounding said stem adjacent said second mentioned annular seat whereby as the two annular seats are forced toward each other, said washer member is compressed therebetween; the projecting portions of said annular seats each being formed to bear in line contact against said washer member, said head being of smaller size than the diameter of said tubular member and projecting beyond the forward end of the latter.

3. In a device of the class described, a valve comprising a tubular member having an intermediate annular and rearwardly projecting seat, a mating valve member having a forwardly projecting annular seat, a stem member extending from said last mentioned member and passing through said first mentioned annular seat, a head on said stem member, resilient means between said first mentioned annular seat and said head normally to urge the annular seats toward each other, and a resilient washer surrounding said stem between said annular seats, the projecting portions of said seats being formed to bear in non-registered line contact against opposite sides of said washer member whereby as the two annular seats are forced toward each other, said washer member may be compressed or flexed therebetween.

4. In a device of the character described, a tubular member having an internal annular flange provided with a valve seat on one side and a shoulder on the opposite side, a mating valve member having a stem lying within said tubular member, said stem extending through said flange and providing an annular fluid passage therethrough, a washer member carried by said stem and retained by said mating valve member in position to engage said valve seat, said valve seat and valve member each being formed to bear in line contact against said washer member, a spring surrounding said stem within said tubular member engaging the shoulder on said flange, and a nut of smaller diameter than the bore of said tubular member attached to the outer end of said stem and engaging the outer end of said spring.

5. In a device of the character described, a tubular member having an internal annular flange provided with a valve seat on one side and a shoulder on the opposite side, a mating valve member having a stem lying within said tubular member, said stem extending through said flange and providing an annular fluid passage therethrough, a washer member carried by said stem and retained by said mating valve member in position to engage said valve seat, a spring surrounding said stem within said tubular member engaging the shoulder on said flange, and a nut of smaller diameter than the bore of said tubular member attached to the outer end of said stem and engaging the outer end of said spring, the outer surface of said tubular member adjacent to said nut being tapered for entry in an air chuck.

6. In a device of the character described, a tubular member having an internal annular flange provided with a valve seat on one side and a shoulder on the opposite side, a mating valve member having a stem lying within said tubular member, said stem extending through said flange and providing an annular fluid passage therethrough, a washer member carried by said stem and retained by said mating valve member in position to engage said valve seat, said valve seat and valve member each being formed to bear in line contact against said washer member, a spring surrounding said stem within said tubular member engaging the shoulder on said flange, and a nut of smaller diameter than the bore of said tubular member attached to the outer end of said stem and engaging the outer end of said spring, the outer surface of said tubular member adjacent to said nut being tapered for entry in an air chuck.

7. In a device of the class described, a valve comprising a tubular member having an intermediate annular seat, a mating valve member having an annular seat, a stem member extending from said valve member and passing through said first mentioned seat, resilient means acting on said stem to urge said seats toward each other, one of said annular seats being convex and terminating in a feather edge and the other annular seat being concave and terminating in a feather edge in non-registry with said first mentioned edge, and a resilient member between said seats adapted to be compressed or flexed between said feather edges as the two seats are forced toward each other.

8. In a device of the class described, a valve comprising a tubular member having an internal annular flange provided with an annular seat terminating in a rearwardly facing feather edge, a mating valve member having an annular seat terminating in a forwardly facing feather edge, a stem member extending from said valve member and passing through said flange, resilient means normally urging said annular seats toward each other, a resilient washer on said stem between said feather edges, and an enlargement on said stem adapted to abut the forward side of said washer, said enlargement being normally located within but spaced from said internal flange, the annular feather-edged seat on said flange being contoured to facilitate re-entry of said enlargement therewithin.

WILLIAM CARPENTER CARD, Jr.